(12) United States Patent
Guillemette et al.

(10) Patent No.: US 10,035,322 B2
(45) Date of Patent: Jul. 31, 2018

(54) MICROLAYER COEXTRUSION OF ELECTRICAL END PRODUCTS

(71) Applicant: Guill Tool & Engineering Co., Inc., West Warwick, RI (US)

(72) Inventors: Richard Guillemette, West Warwick, RI (US); Robert Peters, Providence, RI (US); Christopher Hummel, Providence, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 565 days.

(21) Appl. No.: 13/916,551

(22) Filed: Jun. 12, 2013

(65) Prior Publication Data

US 2014/0034355 A1   Feb. 6, 2014

Related U.S. Application Data

(60) Provisional application No. 61/658,743, filed on Jun. 12, 2012.

(51) Int. Cl.
| | | |
|---|---|---|
| B32B 1/08 | (2006.01) | |
| H01B 1/20 | (2006.01) | |
| H05F 1/02 | (2006.01) | |
| B32B 27/06 | (2006.01) | |
| B29C 47/00 | (2006.01) | |
| B32B 27/08 | (2006.01) | |

(52) U.S. Cl.
CPC ............ *B32B 1/08* (2013.01); *B29C 47/0004* (2013.01); *B29C 47/0023* (2013.01); *B32B 27/06* (2013.01); *B32B 27/08* (2013.01); *H01B 1/20* (2013.01); *H05F 1/02* (2013.01)

(58) Field of Classification Search
CPC .................................... H01B 1/20; H05F 1/02
See application file for complete search history.

(56) References Cited

U.S. PATENT DOCUMENTS

| | | | | |
|---|---|---|---|---|
| 3,759,647 | A * | 9/1973 | Schrenk | G02B 5/287 264/171.13 |
| 5,759,462 | A * | 6/1998 | Jordan | 264/105 |
| 6,558,840 | B1 * | 5/2003 | Hikmet | 429/212 |
| 6,936,203 | B2 * | 8/2005 | Reilly | B29C 47/0023 264/176.1 |
| 2002/0132075 | A1 * | 9/2002 | Friend | B29C 47/0021 428/35.7 |
| 2004/0109298 | A1 * | 6/2004 | Hartman et al. | 361/762 |
| 2004/0123450 | A1 * | 7/2004 | Ward | H01M 4/04 29/623.3 |
| 2005/0037262 | A1 * | 2/2005 | Vallee et al. | 429/217 |
| 2005/0045358 | A1 * | 3/2005 | Arnold | 174/51 |
| 2008/0295955 | A1 * | 12/2008 | Cawse et al. | 156/276 |
| 2010/0098126 | A1 * | 4/2010 | Singer | H01S 3/0621 372/50.11 |
| 2010/0221511 | A1 * | 9/2010 | Benson | G02B 5/0841 428/212 |

(Continued)

*Primary Examiner* — Katie L Hammer
(74) *Attorney, Agent, or Firm* — Ziegler IP Law Group, LLC (57) ABSTRACT

The present invention including the disclosed embodiments thereof generally relate to extruding multiple laminated flow streams using microlayer extrusion, and in particular to creating and forming products with electrical properties that are formed from layers and particles with dimensions in the micro to nanometer range.

11 Claims, 6 Drawing Sheets

(56) References Cited

U.S. PATENT DOCUMENTS

2012/0216903 A1\* 8/2012 Osborne ................ B65H 69/08
 138/137
2012/0237746 A1\* 9/2012 O'Donnell ................ B32B 7/02
 428/216

\* cited by examiner

MICROLAYER COEXTRUSION OF ELECTRICAL END PRODUCTS

FIELD

The aspects of the disclosed embodiments thereof generally relate to microlayer extrusion of flow streams with electrical properties including dies, products and methods of preparing these flow streams with electrical properties. More specifically, these dies and flow streams can form layers that may be optionally deposited sequentially to form layer by layer products. These flow streams may also form multiple laminated flow streams in which certain streams comprise electrical properties. These flow streams may also be folded so as to form continuous layers containing folds or pores. More specifically, these flow streams may create and form products with electrical properties comprising layers and particles with dimensions in the micro to nanometer range.

BACKGROUND

Continuous layer-multiplying coextrusion processing of metal-filled polymers into conducting structures has been described in "Polymer microlayer structures with anisotropic conductivity," S. Nazarenko, A. Hiltner and E. Baer, Department of Macromolecular Science, and Center for Applied Polymer Research, Case Western Reserve University, Cleveland, Ohio 44106-7202, Journal of Materials Science, 34 (1999) 1461-1470 (Kluwer Academic Publishers), the disclosure of which is incorporated herein by reference in its entirety. In this process filled and unfilled polymers are combined into unique structures with many alternating layers of two or more components. The total number of layers can range from tens to thousands. The ability of microlayering to "organize" anisotropic particles was used to obtain metal-filled polypropylene tape with highly anisotropic electrical properties. Orientation of metal flakes by microlayering increased the anisotropy in resistivity by two orders of magnitude over compression molding. Isolation of individual filled layers by alternating filled and unfilled layers resulted in materials with many independent conducting pathways. Filled layers with 10% (v/v) coppdakes or 15% (v/v) nickel flakes were conductive only if the filled layers were thick compared to the thickness of the flake particles. When the thickness of the filled layers approached the particle thickness, the conductive properties were lost. This behavior was understood by comparing the three-dimensional arrangement of flakes in thick conductive layers with the two-dimensional particle layout of thin non-conductive layers.

General principles regarding the methods and extrusion dies that can be adapted to form the microlayer electrical conducting extrusions in products layer by layer as well as dies in which the layers are created through folding may be found in United States Patent Publication No. 2012/0189789 "Method and Apparatus for Forming High Strength Products" and in U.S. Pat. No. 7,690,908 issued Apr. 6, 2010 referring to folded flows with nanofeatures. Other methods are described in U.S. Pat. Nos. 6,669,458, 6,533,565 and 6,945,764. Each of the aforesaid publication or patent is herein incorporated by reference in its entirety.

In one specific microlayer extrusion process, each of the laminated flow streams is subject to repeated steps in which the flows are divided and overlapped to amplify the number of laminations. The amplified laminated flows are rejoined to form a cumulated laminated output which can achieve dimensions as thin as the micro or nanometer range. One example of a device that can be used in a microlayer extrusion process to create a laminated output is US Patent Publication 2012/0189789, filed on Dec. 23, 2011, entitled Method and Apparatus for Forming High Strength Products, the disclosure of which is incorporated herein by reference in its entirety. This nano-flow die device (referred to herein as the "nano-flow die") can be used to create layers in a multi-layered product that have at least one dimension in the nanometer range.

SUMMARY

The aspects of the disclosed embodiments are directed to extrusion products possessing electrical properties. More specifically, these extrusion products contain thin layer(s) (milli, micro or nano) wherein one or more layers contain electrical conducting materials and more specifically nanoparticle electrical conducting materials. Aspects of the disclosed embodiments are also directed to creating and producing nanoparticle products using microlayers to enhance the electrical properties of the products. In one embodiment, each layer may be comprised of one or more elements that facilitate one or more of the layers to conduct electricity.

A specific embodiment relates to an extruded thin layer polymer product comprising one or more layers possessing electrical properties. A more specific embodiment relates to a product wherein said one or more layers are milli, micro or nano size, wherein said one or more layers contain nanoparticle electrical conducting materials. More specifically wherein said product wherein said one or more electrical conducting layers are layered between nonconducting layers.

Another embodiment relates to a product, wherein at least one layer containing a conducting material is between 20 nm to 500 µm, more specifically 20 nm to 100 µm. Other embodiments are between 20 to 500 nm. Other dimensions of interest include: between 20 to 250 nm and between 50 to 250 nm.

The electrical conducting material also has specific dimensions of interest. Some particles may be 100 µm in at least one dimension. Other particles may be 1 µm in at least one dimension. Other particle embodiments may be in the nano dimension such as 500 nm, 250 nm, 100 nm, 10 nm or 1 nm.

Another embodiment relates to a method of preparing multilayer electrical conducting extrusions, comprising: receiving a flow of extrudible material in an extrusion system and constructing a series of ribbon shaped flow streams wherein at least one of the streams comprises conducting particles; subjecting the ribbon shaped flow streams to multiple sequences of stages, wherein, in each of said sequences the flow streams are compressed, said sequences further comprising: joining sets of the series of ribbon shaped flow streams to form multiple laminated flow streams flowing in parallel; dividing each of the multiple parallel laminated flow streams into at least two adjacent flow streams, while compressing the resulting flow streams to form thinner laminations; overlapping the adjacent flow streams to form a flow stream, thereby multiplying the number of laminations; repeating the dividing and overlapping steps in parallel for each of the multiple parallel laminated flow streams to multiply the number of laminations and to generate progressively thinner laminations until at least one electrical conducting layer is obtained.

Another embodiment relates to a method, wherein the multiple laminated flow streams are combined to form a single output laminated flow stream wherein at least one of the layers has a thickness of 100 µm to 10 nm, 100 µm to 1 µm, or 1 µm to 25 nm.

Another embodiment relates to a method wherein the laminated flow stream having electrical conducting properties is introduced to an extrusion die having rotating components to wind the laminated flow to form a tubular product.

Another embodiment relates to a method wherein the received flow of extrudible material is first divided into multiple balanced capillary flow streams.

Another embodiment relates to an extrusion system comprising: a first stage of die plates constructed to receive a flow of extrudible material and divide said flow into multiple ribbon shaped flow streams; a second stage of die plates constructed to receive the multiple ribbon shaped flow streams and further divide each of said multiple ribbon shaped flow streams into at least two ribbon shaped flow streams and further said second stage of die plates constructed to layer said at least two ribbon shaped flow streams into composite laminated flow streams; and a third stage of die plates constructed to receive the composite laminated flow streams and to again divide each of said composite laminated flow streams into at least two ribbon shaped flow streams and further said third stage of die plates constructed to layer said at least two ribbon shaped flow streams into composite laminated flow streams, wherein the number of laminations is multiplied and compressed.

Another embodiment relates to an extrusion system, wherein the multiple flow streams from the first stage of die plates are displaced in a stack to create multiple flow streams flowing in parallel.

Another embodiment relates to an extrusion system, wherein the divided flow streams of the second and third stages of die plates are displaced transversely to the stack to create side by side flow streams for layering into laminations.

Another embodiment relates to an extrusion system, further comprising a distribution stage of die plates constructed upstream of the first stage, said die plates in said distribution stage constructed to receive the flow of extrudible material and divide said flow of extrudible material into a balanced flow of capillary flow streams for delivery to said first stage of die plates.

Another embodiment relates to an extrusion system comprising: a distribution die module constructed to receive a flow of extrudible material and divide said flow into multiple capillary streams at a downstream outlet of the distribution die module; a first transition die module constructed to receive the multiple capillary streams from the distribution die module and transform the capillary streams into multiple ribbon shaped streams, expanded in number by a predetermined factor and reduced in cross sectional flow area, at the outlet of the first transition die module; a second transition die module constructed to receive the multiple ribbon streams from the first transition die module, to layer said multiple ribbon streams into one or more laminated streams, and to divide each of the multiple laminated ribbon streams into at least two sets of multiple ribbon streams at the outlet of the second transition die module; a third transition die module constructed to receive the at least two sets of multiple laminated ribbon streams from the second transition die module and to further layer the multiple laminated ribbon streams to increase the number of laminations of each ribbon stream and to combine said further layered laminated ribbon streams into a reduced number of laminated streams at the output of the third transition die module; a final die module constructed to receive the reduced number of multiple laminated streams from the third transition module and to subject said multiple laminated streams to further dividing and layering to multiply the number of laminations in each of the multiple laminated ribbon streams to form multiple laminated ribbon streams having a laminated structure with increasing numbers of thinner and thinner laminations to form an extruded material having milli, micro or nano-sized features.

Another embodiment relates to an extrusion system wherein the distribution die module includes a first distribution die having multiple distribution grooves to provide a balanced flow into multiple capillary outlets.

Another embodiment relates to an extrusion system wherein the outlet of the first transition die module is constructed having a substantially rectangular cross section to convert the capillary flow to a ribbon flow.

Another embodiment relates to an extrusion system wherein the distribution die module, the first, second and third transition die modules and the final die modules are arranged to process the flow of extrudible material in parallel flow streams.

Another embodiment relates to an extrusion system further comprising an output die module that combines the multiple laminated ribbon streams into a single output laminated stream having nano-sized features.

Another embodiment relates to a method, comprising: extruding a flow of extrusion material containing electrical conducting particles in a non-rotating extrusion assembly; forming a first set of multiple laminated flow streams from the extruded flow; amplifying a number of the laminations by repeatedly compressing, dividing and overlapping the multiple laminated flow streams; rejoining the parallel amplified laminated flows; forming a first combined laminate output with nano-sized features from the rejoining; and forming a tubular shaped micro-layer electrical conducting product from the combined laminate output. Another embodiment relates to said method, wherein forming the tubular shaped micro-layer electrical conducting product comprises: introducing the combined laminate output containing electrical conducting particles into an exit flow passage of then non-rotating extrusion assembly, the exit flow passage being skewed from a parallel direction of the flow stream at a pre-determined helical pitch angle relative to a central axis of the non-rotating extrusion assembly; and bonding the ends of the combined laminate output.

Another embodiment of the present disclosure relates to taking a non-conductive material, such as a polymer, and creating an electrically conductive product in the die, including milli, micro or nano-flow dies, using the polymer. In one embodiment, making an electrically conductive product using the polymer comprises filling the polymer with a conducting material such as a metal. The term "filling" is generally used to define a state where there are sufficient conductive particles within the product or layer to establish a conductive state. As will generally be understood in the art, this can include a product layer that only partially comprises conductive elements or particles. In alternate embodiments, any suitable material that enables or provides for electrical conductivity can be used to create an electrically conductive product using the polymer, such as metals, graphite, synthetic organic and organometallic threads (polyacetylene, polypyrrole, and polyaniline) and their copolymers, Poly(p-phenylene vinylene) (PPV) and its soluble derivatives and poly(3-alkylthiophenes).

Polymers, such as polymer nanocomposites (PNC) are polymers or copolymers containing dispersed nanoparticles.

Nanoparticles, as that term is used herein, generally refers to particles having at least one dimension in the nanometer range, such as less than 100 nanometers. The die devices, such as milli, micro or nano-flow die devices, referred to above can also use polymers that have nanosized particles in the creations of such products and may possess electrical properties particularly as they reach a certain alignment density in the extrusion stream.

Polymers may also in certain situations include micrometer particles and particles with electrical properties. One specific particle may have one dimension less than 250 microns.

If one were to use a polymer nanocomposite in a die, such as a milli, micro or nano-flow die referred to above, and look at the layers under a microscope, a single layer produced by the die can have a designed thickness down from millimeter through micro to nanometer thicknesses, such as 100 μm, 10 μm, including nano thicknesses (when the nano-flow die is used) such as for example of approximately 250 nm. In alternate embodiments, the layer can be any suitable size, other than including 250 nm. Inside that layer, there can also be particles that could measure for example approximately 15 nm.

The number of microlayers that can be applied to a product incorporating aspects of the disclosed embodiments is not limited. The number of layers, or microlayers in a product produced by the die, including milli, micro or nanoflow die devices, of the disclosed embodiments can range in number from the tens to thousands.

It is generally understood that the conducting materials, such as metal particles, can be organized, such as in one or more of the layers in a microlayer structure. In such a layered structure, this organization or structure can also be applied to other particles as well in order to, for example, enhance the tensile properties of the structure so the structure can span greater distances under its own weight (i.e. tensile strength enhancing non-conductive particles in the in the insulating layer).

DETAILED DESCRIPTION

Interest in conductive plastics has been stimulated by the numerous opportunities afforded by the rapidly developing electronics industry, particularly for EMI shielding, in low temperature heaters, and as transducers. Although most polymers are insulators, conductive properties can be achieved by blending with conducting materials such as a metal filler. Metal-filled polymers undergo a sharp transition from an insulator to a conductor at a critical filler concentration. The sharp change is due to the formation of a network among the conducting filler particles. This network does not necessarily imply physical contact between adjacent particles; hopping or tunneling, i.e. the processes by which an electron jumps across an insulator gap, can also produce the network. Network formation is frequently treated as a percolation process.

Geometric constraints imposed by layer multiplying may produce very strong shear stresses which, in turn, facilitate particle orientation in the plane of the extruded layers.

In another embodiment, micro-layer products such as those mentioned herein that do not use a substrate can be taken from pellet form to a finished product in a single extrusion operation. This advantageously drastically reduces production costs. This is especially true for semiconductor applications.

Examples of products that can be manufactured as microlayer products, as generally described herein, using a nanolayer device for example, can include, but are not limited to, conductive composite nano-materials that provide a resistance to Electro-Static Discharges (ESD) such as lightning strikes or Electromagnetic Pulse (EMP), High Power Microwave (HPM) attacks, as well as management of natural and man-made Electromagnetic Interference (EMI).

An additional advantage of micro-layer products incorporating aspects of the disclosed embodiments is that the reduction of metal can reduce weight. An electrically conducting product creating using nanolayers can reduce the amount of metal required to maintain the desired degree of electrical continuity. This is advantageous when creating products that benefit from lighter weight materials.

Other examples of various products that can be produced using the nanoflow device of the disclosed embodiments are illustrated and described below.

Figure 1:
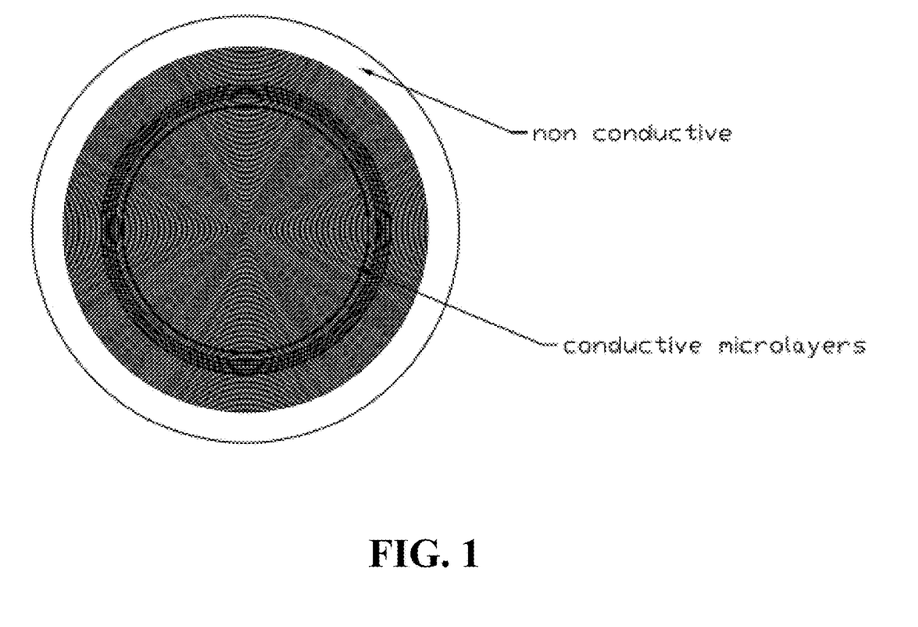
FIG. 1 illustrates a solid rod of annular conductive microlayers.
Figure 2:
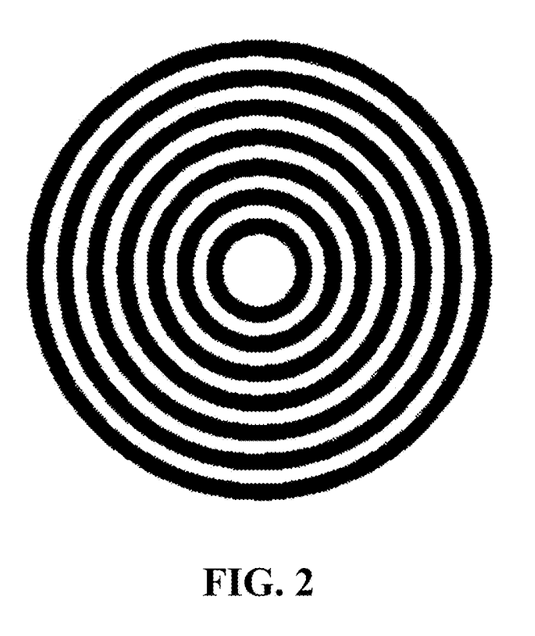
FIG. 2 illustrates a solid rod with alternating layers of annular non-conductive and conductive microlayers.

FIG. 1 illustrates a solid rod of annular conductive microlayers, while FIG. 2 illustrates a solid rod with alternating layers of annular non-conductive and conductive microlayers.

Figure 3:
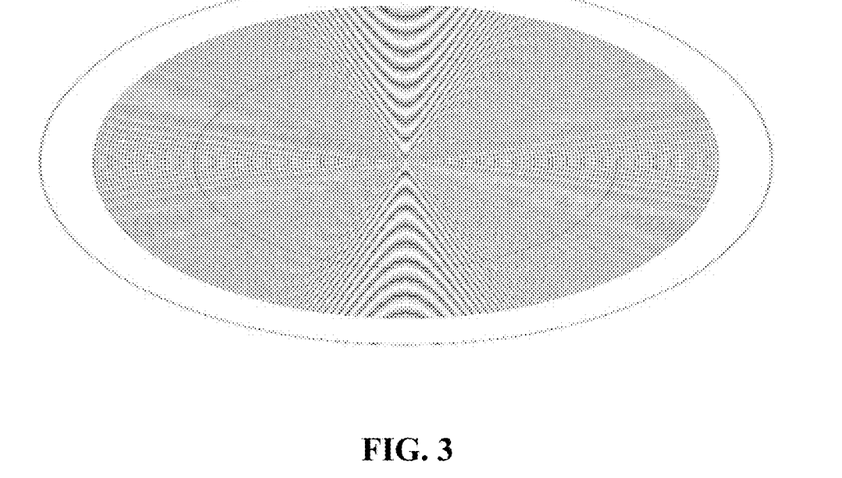
FIG. 3 illustrates an elliptical version of the embodiments shown in FIGS. 1 and 2.

FIG. 3 illustrates an elliptical version of the embodiments shown in FIGS. 1 and 2. In alternate embodiments, the rod structure could also be in the form of a square, a special profile or other suitable geometric shape. The extruded material may also have a corrugated shape. Spiral and helical shapes are also possible.

Figure 4:
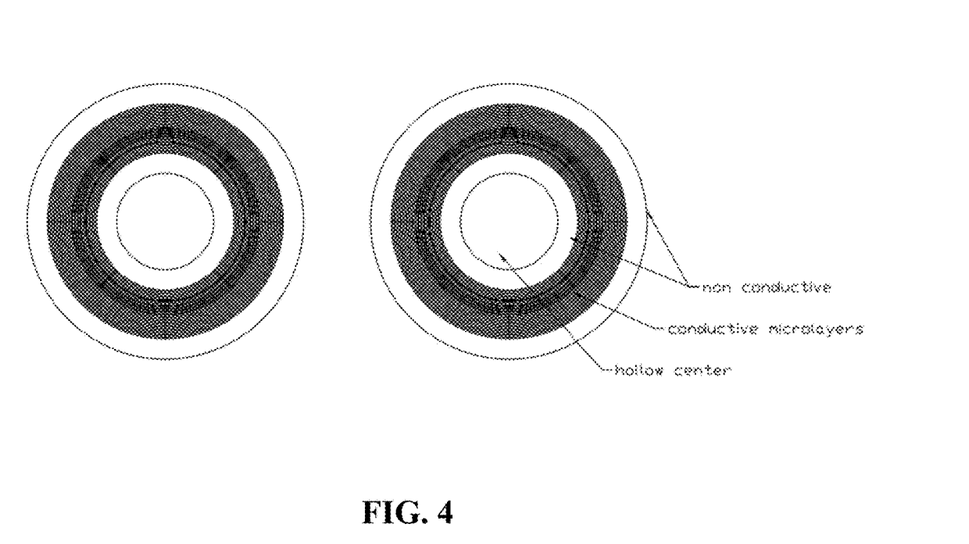
FIG. 4 illustrates one embodiment of an annular conductive microlayered cable that includes a hollow center.

FIG. 4 illustrates one embodiment of an annular conductive microlayered cable that includes a hollow center.

A typical wire may be covered with one or more layers of a non conductive insulator and have a solid core, similar to that shown in FIG. 1. In the example of FIG. 4, the wire is an annular conductive micro-layered tube and it is covered with non-conductive layers. Applications of such a wire include, but are not limited to, heating a fluid, a superconductor (with a gas or fluid passing thru the core or hollow center), replacement for a conventional wire, and making a parison for a blow molded product.

Figure 5:
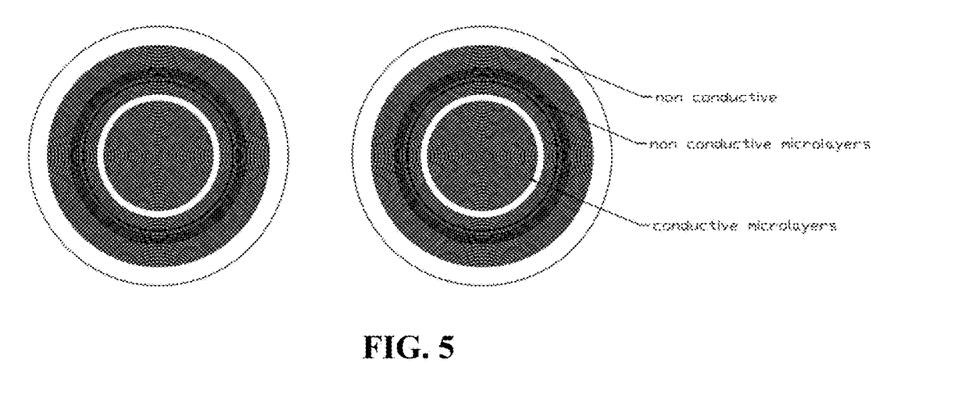
FIG. 5 illustrates one embodiment of micro-layer structure that includes an annular non-conductive microlayered structure around a conductive microlayered rod.

FIG. 5 illustrates one embodiment of micro-layer structure that includes an annular non-conductive microlayered structure around a conductive microlayered rod.

A typical wire will be covered with one or more layers of a non conductive insulator such as that shown in FIG. 1. In the example of FIG. 5, the wire is a conductive microlayered rod and it is covered with non-conductive microlayers. Applications for the structure shown in FIG. 5 can include, but are not limited to superconductors and replacement of a conventional wire.

Figure 6:
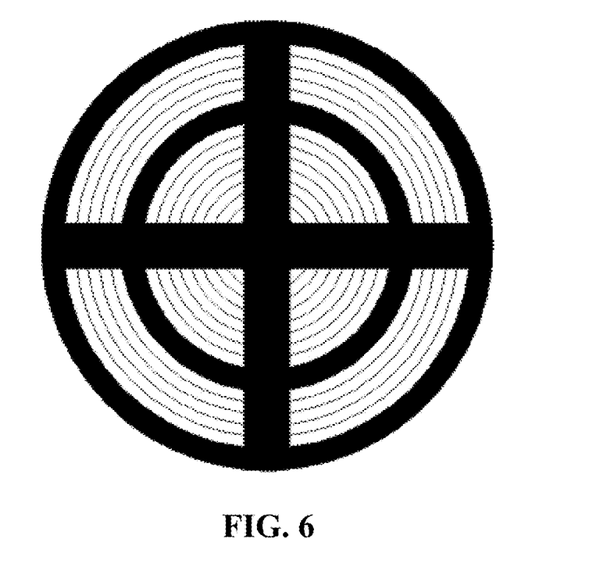
FIG. 6 illustrates an embodiment of a micro-layer that includes multiple streams of conductive layers seperated by non-conductive material.

FIG. 6 illustrates an embodiment of a micro-layer that includes multiple streams of conductive layers seperated by non-conductive material. Each stream can serve as its own conductive pathway which would be analagous to eight separate wires. Other embodiments could include any number and arrangements of seperated layers.

Figure 7:
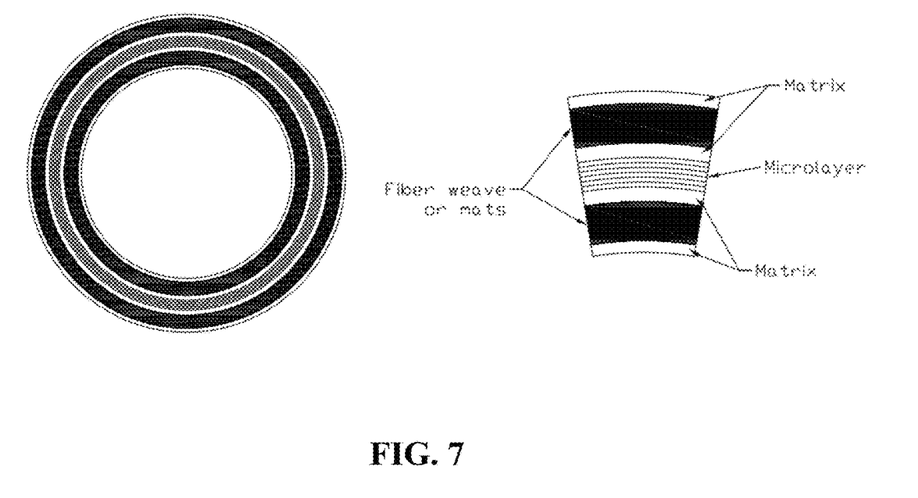
FIG. 7 illustrates an embodiment of a micro-layer structure that includes annular repeating matrix/fiber or mats around a conductive microlayered rod.

FIG. 7 illustrates an embodiment of a micro-layer structure that includes annular repeating matrix/fiber or mats around a conductive microlayered rod. The matrix can also be extruded.

Figure 8:
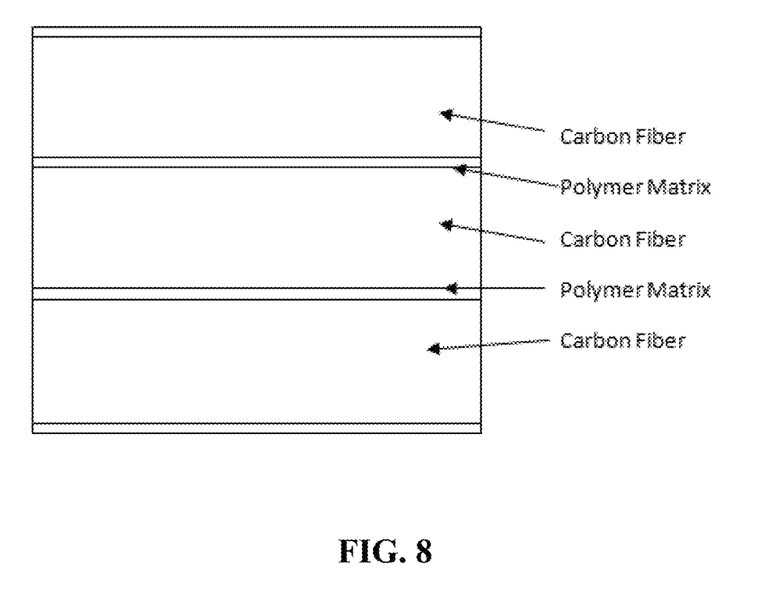
FIG. 8 illustrates a regular layered composite material structure.

FIG. 8 illustrates a regular layered composite material structure.

Figure 9:
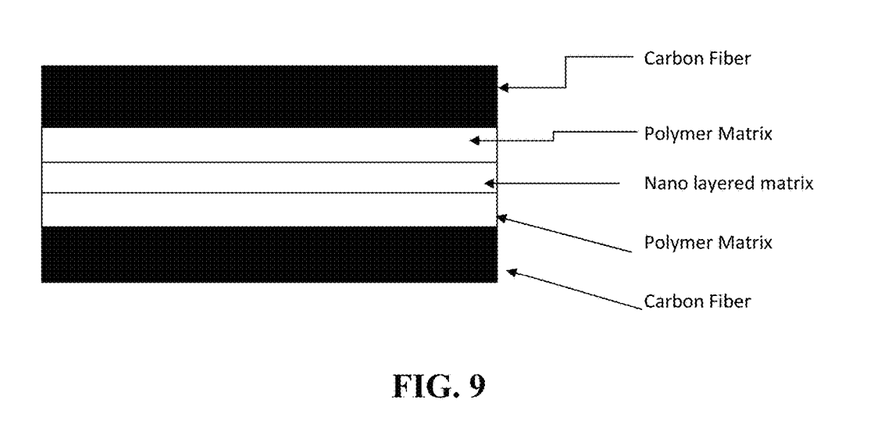
FIG. 9 illustrates one embodiment of a nano layered matrix.

FIG. 9 illustrates one embodiment of a nano layered matrix

As is shown in FIG. 8, normally a composite material structure is made with multiple layers of weaved fibers embedded in a polymer matrix. The matrix is applied onto a layer of woven fiber and another ply of fiber is added on. The process is repeated until the desired number of plys is reached. However, as is shown in FIG. 9, rather than simply coating the fibers in the matrix, the polymer matrix can be extruded onto the carbon fiber weave with internal nano layer matrix between two layers of pure polymer matrix. The pure matrix layers may not be necessary if there aren't large additives or if the additives do not negatively impact adhesion between the matrix and the fibers. These nano layers may allow the use of metallic flakes as an additive to create a conductive layer. There is the potential to mix and match other additives to create other barrier properties as well. This can be done in the same nanolayers or separate nanolayers.

Applications of the structure shown in FIG. 9, can include, but are not limited to hollow or solid structural components for conducting electricity and/or heating a fluid or superconductor (with a gas or fluid passing thru the core).

Figure 10:
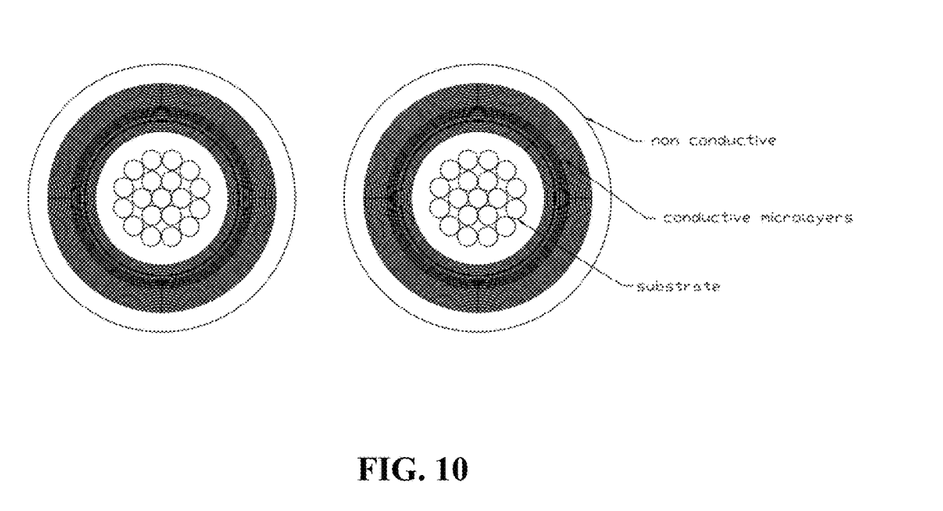
FIG. 10 illustrates one embodiment of micro-layer nanostructure that includes an annular conductive microlayered structure around a substrate.

FIG. 10 illustrates one embodiment of micro-layer nanostructure that includes an annular conductive microlayered structure around a substrate. Applications of the structure can include, but are not limited to superconductor applications.

Alternatively, the structure can include an annular non-conductive microlayered structure around a substrate. Applications of such a structure can include an insulator.

Figure 11:
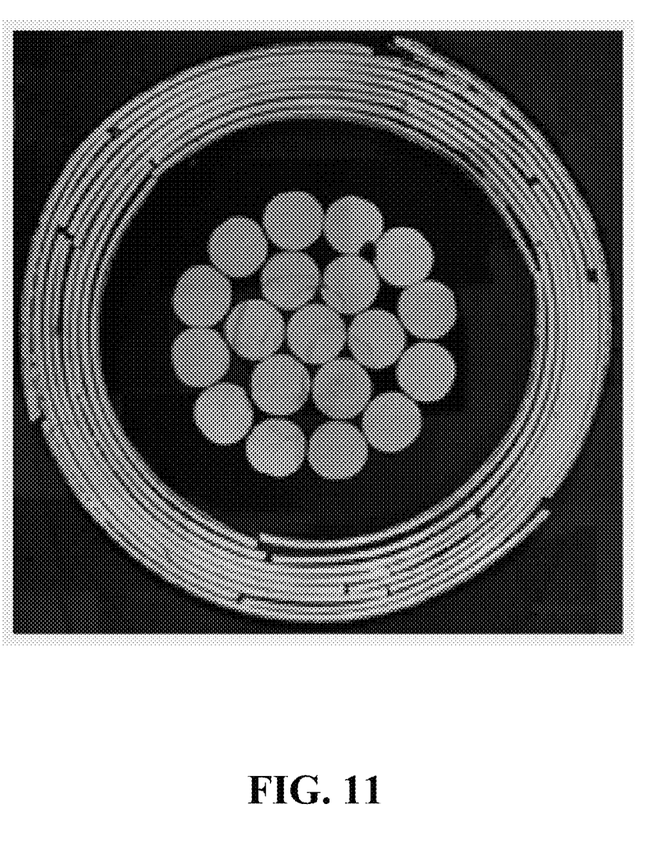
FIG. 11 illustrates a superconducting cable with superconducting tapes wound around a multistrand copper core.

In one embodiment, the aspects of the present disclosure relate to extruding superconducting tapes that are wound around a multistrand copper core of a superconducting cable, such as that shown in FIG. 11. The superconducting tapes can be manufactured using the nanoflow device of the disclosed embodiments, which greatly simplifies the manufacturing process. United States Patent Publication 2010/0197505 describes certain tape extrusions but has limited utility due to the very elaborate manufacturing process (see page 4). The aspects of the disclosed embodiments provide for producing far greater amount of tapes, over a thousand, for example in a much simpler process.

In another embodiment, the shape of the tapes can be extruded in a substantially straight form. In alternate embodiments, the extruded shape of the tapes can be twisted, such as when using the rotary head of U.S. Pat. No. 6,447,279, or twist the tapes such as United States Patent Publications 2010/0197505 and US2005/0181954. In United States Patent Publication No. 2010/0197505 (page 2, paragraphs 0021 and 0024) there is mention of reducing tape widths to change the effect of hysteretic losses. The die device, including milli, micro, or nanoflow die devices, referred to herein can be configured to create a large number of arrayed melt streams or "tapes", reducing the "tapes" width.

In accordance with aspects of the disclosed embodiments, the coating of the central "cable" could all be done in a single extrusion process.

The current state of the art has limitations in flexibility because the array of rigid metal tapes restrict movement. There is also potential for those tapes to permanently kink when bent.

The aspects of the disclosed embodiments include the manufacturing (extrusion) process for making such a product with conductive microlayers.

In another embodiment, layers can be extruded between the superconductor "tapes" to minimize AC losses or the tapes can be extruded to make direct (electrical) contact with each other.

The central core can be made of a conductive metal or other material.

Another embodiment of alternating conductive and non-conductive layers is a capacitor where the conductive layers will hold a charge and the non conductive layers will serve as a separator/dielectric.

Other applications can include, but are not limited to conducting polymers for use in lithium ion batteries and nanocellulose products, such as electronic and medical products. In a lithium ion battery, the main parts includes a Positive Electrode (Cathode), a Negative Electrode (Anode), a separator and a Liquid Electrolyte (typical Li battery) or Solid polymer composite electrolyte (Li-Ion Polymer Battery).

The anode in Li-Ion polymer Battery is typically made from graphite. Silicon can store 10× more lithium ions than graphite, but swells more than 3× its volume when fully charged, which breaks electrical contacts. Silicon nanopowder in a conductive polymer binder or a polymer binder with carbon black for conductivity is used to decrease swelling. Swelling of silicon is still problematic in that repeated swelling and shrinking of the silicon particles push away the carbon black particles.

The use of conductive polymers would allow the anode material to be extruded. Polymers such as polyaniline (PAN) or preferably the polymer mentioned in <http://www.onlinetes.com/tes0312-lithium-ion-battery-anodes.aspx> could be used. In one embodiment, the outer cathode layer, with an extruded inner hollow or solid anode layer can be formed using a conductive polymer. The electrodes can be separated by an extruded layered separator, referred to as a battery separator, described below. The cathode could be extruded as an outer layer or deposited through other means, such as CVD or PVD, for example.

The battery separator is a porous sheet placed between the positive and negative electrodes in a battery. Its function is to prevent physical contact of the positive and negative electrodes while allowing free ionic transport between them. In a Li-Ion Polymer Battery the separator can serve as both the electrolyte and separator between the electrodes.

Synthetic polymers including polyolefins, polyvinylidene fluoride, polytetrafluoroethylene, polyamide, polyvinyl alcohol, polyester, polyvinyl chloride, nylon, poly(ethylene terephthalate), etc. have been used as this layer. Aspects of these polymers are referred to in an article Zhang, Sheng Shui (2008 Jul. 22). Battery Separator. *SciTopics*. Retrieved Jun. 7, 2012, from http://www.scitopics.com/Battery_Separator.html.

The passage of ions though the polymer separator is allowed due to pores in the material. These can be produced either through a wet or dry process, as they are commonly referred. The wet process allows the separator layer to be extruded and the pores produced after extrusion through extraction, while in the dry process the polymer separator is stretched after extrusion to form micropores. <http://en.wikipedia.org/wiki/Polymer_separators#Synthesis>. The separator would include a plasticizer during extrusion which would then be driven off to from the micropores.

The use of multilayered separators allows unique properties. A shutoff layer can be used to prevent excess temperature accumulation. The pores in this layer will close up when the layer reaches the shutoff temperature, preventing the flow of ions. An example of a co-extruded multi-layered battery separator is illustrated in US Patent Pub. No. 20080118827, the aspects of which are incorporated herein by reference.

In one embodiment, the extruded anode layer described in paragraph 0040 and the layered separator described above can be extruded onto a metal cathode wire or filament in accordance with the aspects of the disclosed embodiments. Both the outer cathode layer and extruded anode layer described above, can be bundled together to form a long flexible battery.

Other properties that could be improved with a nano-layered battery separator are high temperature stability, more control over shutdown temperature, increased puncture resistance The aspects of the disclosed embodiments are generally directed to producing multi-layer products using the nano-flow device described in U.S. patent application Ser. No. 13/336,825. The aspects of the disclosed embodiments advantageously can produce electrically conductive nano-layered products in a much simpler manner, as well as microlayered products including nano-sized particles that have increase strength and are lightweight. Aspects of applicable materials and polymers that can be used in the nano-flow device have been generally described above.

The invention claimed is:

1. An extruded thin multi-layer tubular polymer product comprising tens to thousands of annular polymeric layers wherein one or more of said polymeric layers has been filled with electrical conductive particles wherein the electrical conductive particles in at least one of said polymeric layers form an electrical conducting network among the filled conductive particles through alignment of the conductive filler particles along the direction of the extrusion.

2. A product according to claim 1, wherein said one or more polymeric layers are milli, micro or nano size, and wherein said one or more layers contain electrical conducting particles that are nanoparticles.

3. A product according to claim 1, wherein said one or more polymeric layers containing an electrical conducting particles are layered between nonconducting layers.

4. A product according to claim 1, wherein said product is resistant to Electro-Static Discharges (ESD), Electromagnetic Pulse (EMP), High Power Microwave (HPM) attacks, and Electromagnetic Interference (EMI).

5. A product according to claim 1, wherein said product is a battery.

6. A product according to claim 1, wherein said product is a lithium ion battery.

7. A product according to claim 1, wherein said product comprises layers with pores adjacent to conducting layers.

8. A product according to claim 1, wherein at least one of the polymeric layer containing an electrical conducting particles is between 20 nm to 100 µm thick.

9. A product according to claim 1, wherein at least one polymeric layer containing a conducting particles is between 20 to 500 nm thick.

10. A product according to claim 1, wherein at least one of the polymeric layer containing an electric conducting particles is between 20 to 250 nm thick.

11. A product according to claim 1, wherein at least one of the polymeric layer containing an electrical conducting particles is between 50 to 250 nm thick.

* * * * *